United States Patent
Thivierge, Jr. et al.

(10) Patent No.: US 11,513,582 B2
(45) Date of Patent: Nov. 29, 2022

(54) PHONE AS A KEY PREDICTIVE VEHICLE ACCESS

(71) Applicant: Ford Global Technologies, LLC, Dearborn, MI (US)

(72) Inventors: Timothy Thivierge, Jr., Carleton, MI (US); Fouad Bounefissa, Oakville (CA); Jalal Jawany, Canton, MI (US); Jochen Schubert, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 570 days.

(21) Appl. No.: 16/589,828

(22) Filed: Oct. 1, 2019

(65) Prior Publication Data

US 2021/0096629 A1   Apr. 1, 2021

(51) Int. Cl.

| | | |
|---|---|---|
| *G06F 1/3231* | (2019.01) | |
| *B60N 2/00* | (2006.01) | |
| *G07C 5/00* | (2006.01) | |
| *G07C 9/00* | (2020.01) | |
| *H04W 4/80* | (2018.01) | |

(52) U.S. Cl.
CPC .......... *G06F 1/3231* (2013.01); *B60N 2/002* (2013.01); *G07C 5/008* (2013.01); *G07C 9/00857* (2013.01); *H04W 4/80* (2018.02); *G07C 2009/00865* (2013.01)

(58) Field of Classification Search
CPC ........ G06F 1/3231; H04W 4/80; B60N 2/002; G07C 5/008; G07C 9/00857; G07C 2009/00865
See application file for complete search history.

(56) References Cited

U.S. PATENT DOCUMENTS

| | | | |
|---|---|---|---|
| 9,764,742 B1 * | 9/2017 | Goldfarb | ................ G08G 1/017 |
| 9,886,805 B1 * | 2/2018 | Bianchi, III | ....... G07C 9/00309 |
| 2013/0205770 A1 * | 8/2013 | Browne | .................. F03G 7/065 |
| | | | 60/527 |
| 2014/0288821 A1 * | 9/2014 | Modica | .................. G08G 1/123 |
| | | | 701/465 |

(Continued)

FOREIGN PATENT DOCUMENTS

| | | |
|---|---|---|
| EP | 2672739 A1 | 12/2013 |
| WO | 2017180997 A2 | 10/2017 |

OTHER PUBLICATIONS

Low Latency Unlock Analytics Flow Chart.

(Continued)

*Primary Examiner* — Thomas D Alunkal
(74) *Attorney, Agent, or Firm* — Frank Lollo; Eversheds Sutherland (US) LLP

(57) ABSTRACT

A computer-implemented method includes predicting, via a predictive analytical model, a time interval associated with a future key-on event for a vehicle. The predictive analytical model is based at least in part on key-on event data. The method includes generating, based at least in part on the predicted time interval, a power mode instruction configured to cause a vehicle Telematics Control Unit (TCU) or Phone as a Key (PaaK) system to change a TCU state from a low energy state to a higher energy state, and transmitting, based on the predicted time interval, the power mode instruction to the vehicle TCU.

20 Claims, 6 Drawing Sheets

(56) References Cited

U.S. PATENT DOCUMENTS

| | | | |
|---|---|---|---|
| 2016/0159240 A1* | 6/2016 | Tseng | B60L 53/14 |
| | | | 320/155 |
| 2017/0074000 A1* | 3/2017 | Banvait | B60R 16/02 |
| 2018/0290627 A1* | 10/2018 | Hariri | B60R 25/245 |
| 2018/0302859 A1* | 10/2018 | Elangovan | B60R 25/24 |

OTHER PUBLICATIONS

Antuan Goodwin, "Faster, safer and more efficient: How 5G will change tomorrow's car," Road Show by CNET, Oct. 26, 2918 (6 pages).

* cited by examiner

PHONE AS A KEY PREDICTIVE VEHICLE ACCESS

TECHNICAL FIELD

The present disclosure relates to Phone-as-a-Key (PaaK) systems for a vehicle, and more particularly, to reducing latency associated with PaaK systems.

BACKGROUND

A phone-as-a-key (PaaK) system employs personal area networks (e.g. Bluetooth® Low Energy (BLE), etc.) to detect and localize mobile phones without requiring specialized antenna and controllers to communicate over other frequencies (e.g., 125 kHz, 315 MHz, etc.). To extend the key-off time before a vehicle's battery is depleted, vehicles enabled with a PaaK system may cycle from a low power mode after being parked for an extended period of time, to a higher power mode when a user actuates a door handle or performs another action to "wake up" the vehicle. This transition of vehicle power states may maximize usability, and minimize energy usage. However, conventional PaaK systems may not immediately actuate the vehicle (by switching the vehicle from a low power state to a higher power state) based on the user's request (e.g. sending an unlock door signal to door unlock mechanisms when a handle is pulled on the vehicle door) due to latency required to actuate the PaaK system for authentication of the approaching mobile device. This often results from the time delay needed to power up the authenticating processors, determine whether the act and/or devices associated with the wakeup action are authentic and valid, and for sending the control signal that actuates the desired lock, latch, etc.

The use of a mobile device as a key is disclosed in European Patent Pub. No. EP2672739, assigned to Apple, Inc. (hereafter "the '739 Publication'). The '739 Publication discloses using mobile device and vehicle locations for door unlock command decisions by "warming-up" as the mobile device approaches the vehicle location. The '739 Publication relies on mobile device position only, and does not disclose predicting time intervals for sending messages that transition the vehicle from a low-power state to a higher power (operational) mode, nor does that publication account for latency problems associated with conventional PaaK authentication.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
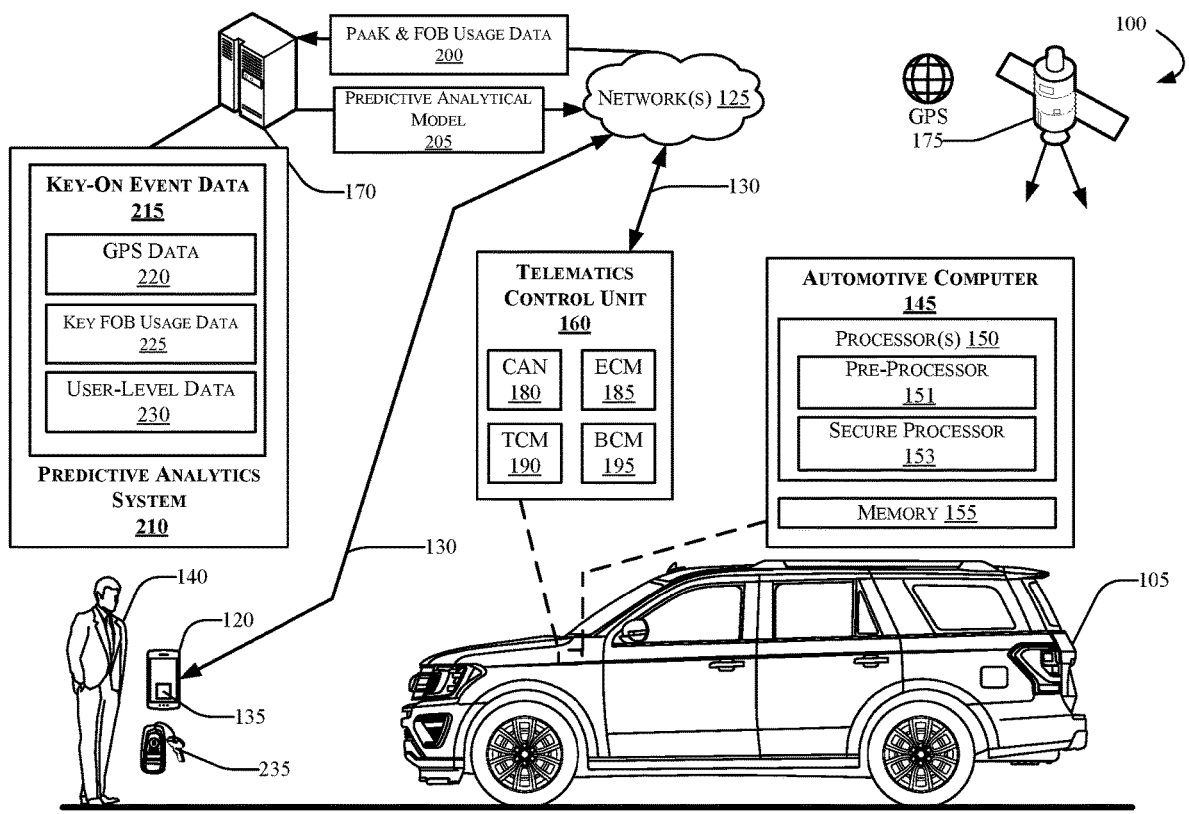
FIG. 1 depicts an example computing environment in which techniques and structures for providing the systems and methods disclosed herein may be implemented.

The systems and methods disclosed herein may provide a computing platform on a server, a mobile device and/or onboard a PaaK-enabled vehicle that can reduce the latency associated with conventional PaaK vehicle actuations. The server or mobile device may send a message to the vehicle at pre-determined times to instruct the phone-as-a-key system onboard the vehicle to exit a low-power, high-latency mode and enter into a higher-power, low-latency mode. These messages can be communicated through different means depending on the vehicle's current location and/or status. These communication paths may include messages sent directly through a telematics control unit (TCU) onboard the vehicle (via a telecommunications network or Wi-Fi) or through a connected mobile device (via Bluetooth®, Wi-Fi, or other radio frequency (RF) device(s)).

The schedule for these messages can be built by analyzing vehicle usage patterns through a predictive analytical model. By gathering key-on time information and vehicle location data, the system(s) described herein may predict when a user is more likely to use a vehicle (for example, on weekday mornings to commute to work or at a specific time range in the evenings to drive to the gym). Additionally, the system can track date and time information, and locations at times indicative of high latency, for example, when the vehicle user was unable to unlock the vehicle on the first attempt. These patterns may be unique for each vehicle and user, or may use aggregate patterns from many vehicles and users collected into various groupings, and may be continuously updated by the server(s) as they collect key-on event information over time. For example, the fleet vehicles may be grouped automatically based into a plurality of vehicle fleets, where the grouping is based on any combination of a vehicle make, a vehicle model, primary approximate geo-locations, vehicle trim level, and/or vehicle feature level.

Embodiments described herein may also leverage vehicle location information to improve the accuracy of the predictions. In one aspect, a predictive analytical model may predict a time interval associated with a future key-on event for the vehicle. The predictive analytical model may be based, at least in part, on key-on event data associated with the vehicle and/or a fleet of vehicles configured to share such information. For example, if the vehicle is located at a customer's home, the system may generate a prediction having a relatively high probability that the customer will commute to work on a weekday morning. If the vehicle is located elsewhere because of vacation travel, the analytics system may selectively apply an alternate prediction model based at least in part on the vehicle location, trajectory, date information, time information, etc. This location information can be sourced through satellite positioning systems (e.g. GPS) or by tracking nearby scanned Wi-Fi and Bluetooth® networks.

Scheduled wake up messages sent from one or more centralized (cloud-based or other type) server(s), or a connected mobile device can provide vehicle intelligence that preemptively determines when a low-power mode is unlikely to be acceptable, and when higher-power modes are most likely helpful to reduce and/or eliminate lag time for vehicle entry and operation. Moreover, embodiments of the present disclosure may centrally (from the cloud-based server(s)) manage how the predictive analytic system is built and sent to the vehicle, allowing centralized control that can maintain updatability and security features for the vehicle(s) receiving the predictive analytical model(s). These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

FIG. 1 depicts an example computing environment 100 that can include a vehicle 105, one or more server(s) 170, and a mobile device 120. The mobile device 120 may communicatively couple with the vehicle 105 and/or the server(s) 170 via one or more network(s) 125, which may transmit data using one or more wireless channel(s) 130. The mobile device 120 may include and/or be configured to execute one or more application(s) 135. The application(s) may perform information retrieval steps that provide information to the server(s) 170, which may be used to generate the predictive analytical model(s) (e.g., the predictive analytical model 205) described herein, for authenticating a user 140 of the vehicle 105, for authenticating the mobile device 120 on which the application(s) 135 may operate, and for providing control instructions to the vehicle 105 as described according to embodiments herein.

The vehicle 105 may include an automotive computer 145, which may include one or more processor(s) 150 and a memory 155. The vehicle 105 may further include a vehicle TCU 160, which may be disposed in communication with and/or be a part of the automotive computer 145. The vehicle TCU 160 may, in some example embodiments, communicate information to and receive communications from the mobile device 120, and/or one or more server(s) 170, which may be associated with and/or include a Telematics Service Delivery Network (SDN) (not shown in FIG. 1). The vehicle 105 may also receive and/or be disposed in communication with a Global Positioning System (GPS) 175.

Although illustrated as a sport utility truck, the vehicle 105 may take the form of any passenger or commercial vehicle such as, for example, a car, a truck, a crossover vehicle, a van, a minivan, a taxi, a bus, a work vehicle, etc. Further, the vehicle 105 may be a manually-driven vehicle, and/or be configured to operate in a fully autonomous (e.g., driverless) mode and/or partially autonomous mode, and may include any powertrain such as, for example, a gasoline engine, one or more electrically-actuated motor(s), a hybrid system, etc.

According to an example embodiment, a user 140 may control one or more application(s) 135 operating on the mobile device 120, to communicate wake up message(s) to the vehicle TCU 160. A wakeup message, which may be and/or include power mode instructions that control the TCU and/or the automotive computer 145, may be based at least in part on a predicted time interval associated with a future key-on event for the vehicle 105. The predicted time interval may include a time or a range of time during which the user 140 may likely want to unlock and/or operate the vehicle 105.

In some aspects, the mobile device 120 may communicate with the vehicle 105 through the one or more wireless channel(s) 130, which may be encrypted or unencrypted, and established between the mobile device 120 and the vehicle TCU 160. The mobile device 120 may communicate with the vehicle TCU 160 using a wireless transmitter (not shown in FIG. 1) associated with the vehicle TCU 160 on the vehicle 105. The transmitter may communicate with the mobile device 120 using a wireless communication network such as, for example, the one or more network(s) 125.

The one or more network(s) 125 illustrate one example of a communication infrastructure in which the connected device(s) depicted in the computing environment 100 may communicate. The one or more network(s) 125 may be and/or include the Internet, a private network, a public network or other configuration that operates using any one or more known communication protocols such as, for example, Transmission Control Protocol/Internet Protocol (TCP/IP), Bluetooth®, Bluetooth® Low Energy (BLE), Wi-Fi, and one or more cellular technologies such as, for example, Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The vehicle TCU 160 can provide communication and control access to a plurality of vehicle computing modules such as, for example, a Controller Area Network (CAN) bus 180, one or more Engine Control Modules (ECMs) 185, a Transmission Control Module (TCM) 190, and/or a Body Control Module (BCM) 195. Control and/or communication with other control modules not shown is possible, and such control is contemplated. In some aspects, the vehicle TCU 160 may control aspects of the vehicle 105 through the control modules 180-195 and implement one or more instruction sets received from the application(s) 135 operating on the mobile device 120.

The automotive computer 145 may include one or more processor(s) 150 and a computer-readable memory 155. The automotive computer 145 may be installed in an engine compartment of the vehicle 105 (or elsewhere in the vehicle 105) as part of a PaaK system in accordance with the disclosure. The automotive computer 145 may include, in one example, the one or more processor(s) 150, and a computer-readable memory 155. In other example embodiments, the vehicle TCU 160 may be integrated with and/or be incorporated with the automotive computer 145. For the sake of simplicity, the computing system architecture of the automotive computer 145 may omit certain computing modules. It should be readily understood that the computing environment 100 depicted in FIG. 1 is one example of a possible implementation according to the present disclosure, and thus, it should not to be considered limiting or exclusive.

The one or more processor(s) 150 may be disposed in communication with one or more memory devices (e.g., the memory 155 and/or one or more external databases (not shown in FIG. 1). The one or more processor(s) 150 may utilize the memory 155 to store programs in code and/or to store data for performing aspects of the present disclosure such as predicting a time interval associated with a key-on event for the vehicle 105, generating a power mode instruction configured to cause the vehicle TCU 160 to change a TCU state from a low energy state to a higher energy state, and/or transmitting a power mode instruction to the vehicle TCU 160 based, at least in part, on the predicted time interval.

The memory 155 may be a non-transitory computer-readable memory. The processor(s) 150 may be configured to execute computer-executable instructions stored in the memory 155 for performing various functions of the PaaK system, as well as for performing vehicle control capabilities in accordance with the disclosure. Consequently, the memory 155 may be used for storing code and/or data code and/or data for performing operations in accordance with the disclosure. The memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The memory 155 may be one example of a non-transitory computer-readable medium, and may be used to store programs in code and/or to store data for performing various operations in accordance with the disclosure. The instructions in the memory 155 can include one or more separate programs, each of which can include an ordered listing of computer-executable instructions for implementing logical functions. In another exemplary implementation, some or all components of the automotive computer 145 may be shared with the vehicle TCU 160.

The memory 155 may store various code modules such as, for example, a secure communication controller (not shown in FIG. 1) for establishing the one or more wireless channel(s) 130 between the mobile device 120, the vehicle TCU 160, and/or the automotive computer 145. The memory 155 may also receive the one or more instruction sets comprising a predictive analytical model 205, which may be generated by and received from the one or more server(s) 170.

Figure 4:
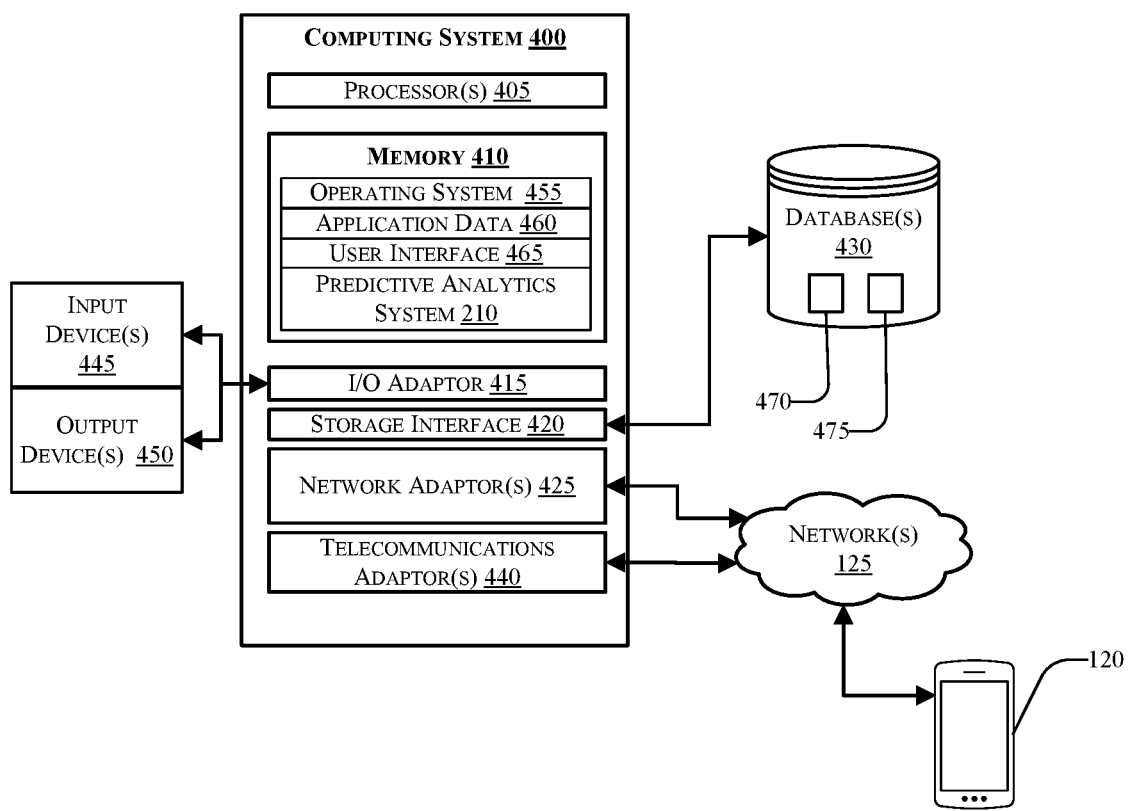
FIG. 4 illustrates a block diagram of an exemplary computer system for use in practicing the embodiments described herein.

The server(s) 170 may be and/or include one or more cloud computing mainframe computing platform(s) configured to receive PaaK and key fob use data 200 (hereafter "use data 200") from the vehicle 105 and/or other vehicles in a vehicle fleet (the fleet vehicles not shown in FIG. 1). FIG. 4 (discussed in greater detail hereafter) describes a computing system 400 that may be significantly similar to and/or identical to the server(s) 170. Although described in this section with respect to the user 140 and the vehicle 105, it should be appreciated that the use data 200 may include and/or be associated with use data from any number of users, vehicles, etc. For example, in one aspect, the server(s) 170 may also include and/or be disposed in communication with a Telematics SDN (not shown in FIG. 1), that communicates with TCUs associated with other vehicles in a vehicle fleet.

In one example embodiment, the vehicle 105, and more particularly, the vehicle TCU 160, may transmit the use data 200 to the server(s) 170 at predetermined intervals of time during the course of everyday vehicle usage. For example, the use data 200 may be transmitted by the TCU and/or received by the server(s) 170 at periodic intervals (one hour, one day, one week, etc.). The use data 200 can include date information and time information associated with times that the user 140 has approached the vehicle 105, unlocked the vehicle 105, operated the vehicle 105, etc. These events are referred to herein, collectively, as key-on event(s), and the date, time, and other information, are referred to herein as key-on event data 215.

In one embodiment, the server(s) 170 may store the key-on event data 215 as part of a predictive analytics system 210. In one example embodiment, the server(s) 170 may include and/or operate the predictive analytics system 210, which may be configured and/or programmed to receive, store, and process the key-on event data 215, GPS data 220, use data 200, and other information associated with the user 140 and/or the fleet of vehicles associated with the server(s) 170.

In one embodiment, the key fob usage data 225 may include information associated with a key fob 235 that is paired with and configured to control operational aspects of the vehicle 105. For example, a key fob is commonly used to control locking, unlocking, arming/disarming, light control, starting, etc. Accordingly, the key fob usage data 225 may include a fob identifier (not shown in FIG. 1) that uniquely associates the key fob 235 with the user 140, the vehicle 105, the vehicle TCU 160, and/or the mobile device 120. In some aspects the fob usage data 225 may further include frequency information, signal strength information, time information, date information, GPS data, and/or other information that may be associated with determining patterns associated with the user 140 and the use of the vehicle 105.

According to another embodiment, calendar information, and/or other schedule information having particular dates and times of activities may be accessed by the server(s) 170 to determine the user-level data 230 associated with the user 140. Accordingly, the user-level data 230 may include schedule information associated with the user 140 that may be specific to that individual. The user-level data 230 may include, for example, calendar information associated with a digital calendar (not shown), and patterns associated with the user 140, where the patterns indicate that a key-on event occurs on particular days of the week, at particular times of the day, on particular calendar days, etc.

Figure 2A:
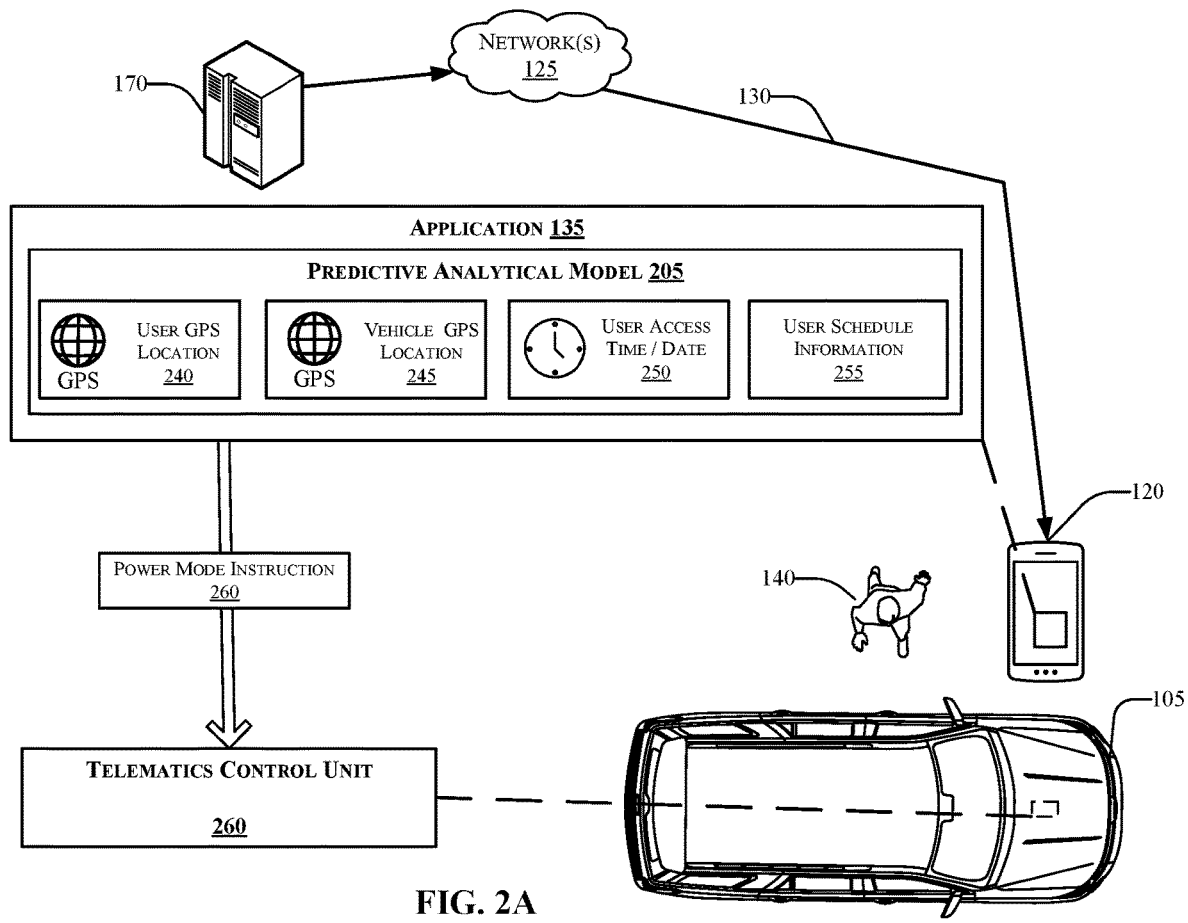
FIG. 2A illustrates an example embodiment of the present disclosure where a predictive model operates from a mobile device to control power mode transitions according to embodiments described herein.
Figure 3:
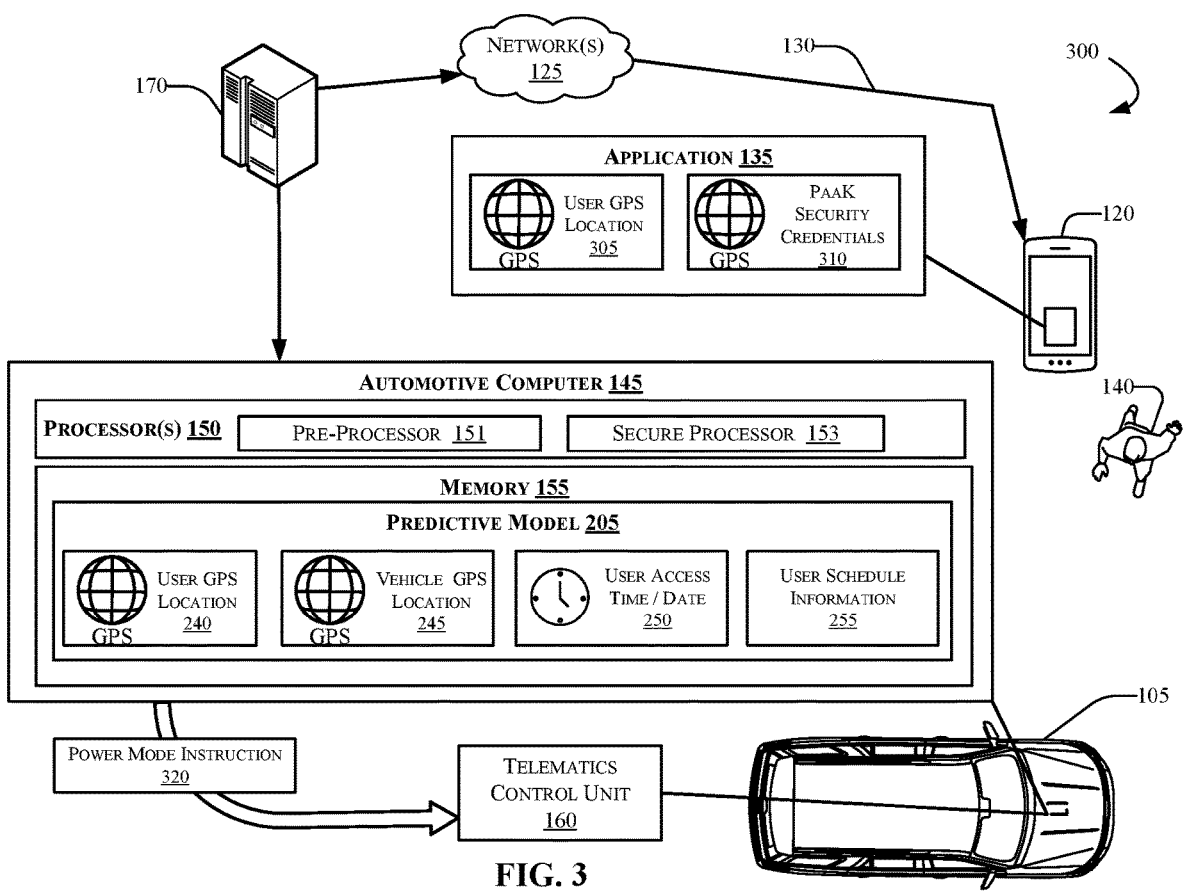
FIG. 3 illustrates another example embodiment of the present disclosure where an automotive computer includes a predictive model to control power mode transitions according to embodiments described herein.

In one example embodiment, the predictive analytics system 210 may generate the predictive analytical model 205 based, at least in part, on the use data 200, and transmit the predictive analytical model 205 to the mobile device 120 associated with the vehicle 105. For example, the mobile device 120 may receive the predictive analytical model 205, store the predictive analytical model 205 on a computer memory (not shown) of the mobile device 120, and access the predictive analytical model 205 using the application(s) 135. FIG. 2A depicts one embodiment where the mobile device 120 is used to perform the predicting and analytical steps that determine a probable date and/or time (e.g., the predicted time interval associated with a future key-on event for a vehicle 105), where the user 140 is predicted to unlock and/or operate the vehicle 105. FIG. 3 depicts an embodiment where the automotive computer 145 is used to perform the predicting and analytical steps that determine a probable date and/or time where the user 140 is predicted to unlock and/or operate the vehicle 105.

First considering FIG. 2A, an example embodiment of the present disclosure is depicted where the mobile device 120 receives the predictive analytical model 205 from the server(s) 170, predicts a time interval for a future key-on event for the vehicle 105, and transmits a power mode instruction 260 to the vehicle 105. In the example embodiment of FIG. 2A, the user 140 may approach the vehicle 105 while in possession of the mobile device 120. The predictive analytical model 205 may determine a predicted time interval for transmitting a power mode instruction to the vehicle 105 via the automotive computer 145 or via the vehicle TCU 160 (as shown in FIG. 1) from the mobile device 120.

It should be appreciated that a predicted time or a predicted interval of time is used herein to describe a time or a window in time during which a user is predicted to, within a predetermined range of probability values, to perform an act or a series of acts associated with key-on events for the vehicle 105. While a discussion of techniques for predicting activities using stochastic or other methodologies known in the art of data analytics may be outside the scope of the present description, it should be appreciated that any of a number of known machine learning techniques are possible, and contemplated for use herein.

According to example embodiments, the mobile device 120 may determine the predicted time interval based at least in part on data inputs that can include, for example, a user GPS location information 240 indicative of a present location of the user 140, vehicle GPS location information 245 indicative of a present vehicle GPS location (or alternatively, vehicle GPS location information 245 associated with the vehicle 105, which may include a set of coordinates indicative of the last known geographic location of the vehicle 105, as determined while in the last higher-power mode), user access time/date information 250 that indicates historical dates and times for key-on events, and/or the user schedule information 255 indicating user-specific data. As introduced above, the predicted time interval, in one example embodiment, may be a span of time (e.g., having a starting date and/or time and an ending date and/or time) based on one or more values indicating a probability that a key-on event will imminently take place. The key-on event may be, for example, actuating a door latch mechanism, opening a door, starting the motor, performing a remote start/climate control, etc.

In FIG. 2A, the user 140 is depicted approaching the vehicle 105. The time and location of the user 140 approaching the vehicle 105 may be predictable based on past data indicative of a similar pattern of vehicle use. For example, the user 140 may use the vehicle 105 to commute to and from work according to their repeated personal schedule. In this example, the user 140 may leave the vehicle 105 parked at an office location, most Monday mornings between 8:00 and 8:15 am, and return to the vehicle 105 most Mondays between 5 and 5:10 pm. Although the vehicle 105 may generate GPS data e.g., the GPS data 220 as shown in FIG. 1, while in a higher-power mode the vehicle GPS data may indicative of the vehicle location may not be available because the vehicle 105 is in a low-power mode. As the user 140 approaches the vehicle 105, the vehicle GPS information may not be available to determine when to transition the TCU 160 from a low-power mode to a higher power mode, and thus, the vehicle GPS data may not be useful. Accordingly, the predicted time interval associated with a future key-on event for the vehicle 105 may provide this additional practical application.

In other aspects, the user GPS location information 240 may indicate position coordinates of the user 140 that match a repeated pattern of user GPS coordinates prior to vehicle key-on events in the past (stored as the user access time/date information 250). Accordingly, as the mobile device 120 determines that the user 140 is within a predetermined distance from the vehicle 105 (e.g., 50 feet, 10 feet, 5 feet, etc.) the mobile device 120 may transmit the power mode instructions 260 to the TCU 160 based, at least in part, on the user GPS location information 240 determined by the mobile device 120 GPS system.

In the present example, the mobile device 120 may actively run (execute an instantiation) of the one or more application(s) 135, and predict a time interval associated with the future key-on event for the vehicle 105. The prediction may be based on a day of the week, a date, a GPS location of the mobile device 120, a GPS location of the vehicle 105, and/or a calendar event associated with the user 104 that is stored in a digital calendar (not shown), or stored in another way (e.g., via a social media calendar, etc.). Accordingly, in an example embodiment of FIG. 2A, the mobile device 120 may be configured for predicting the time interval associated with the future key-on event for the vehicle 105, and transmitting the power mode instruction 260 to the vehicle TCU 160.

In some aspects, transmitting the power mode instruction 260 can include transmitting a wireless signal to a Bluetooth Low Energy (BLE) module associated with the vehicle 105. The power mode instruction 260 may include one or more encoded instruction(s) configured to cause the vehicle TCU 160 to change a TCU state from a low energy state to a higher energy state the predicted time interval using the predictive analytical model 205 stored on the mobile device 120.

Low-energy states and higher-energy states are generally referenced herein to describe operational states associated with TCU energy consumption from an onboard power source, such as a vehicle battery or battery bank (not shown in FIG. 2A). It should be appreciated that TCU systems may place a vehicle TCU in a low-energy state to allow and/or limit vehicle functionality. The energy states may limit wireless communication between the vehicle TCU 160, and other devices within communication range of the vehicle 105, and prevent other types of wireless communication with the TCU while in the low-energy state to conserve battery power while parked for extended periods of time. One example technology for TCU power state management is described in U.S. Pat. No. 9,462,545, assigned to Ford Global Technologies LLC (hereafter "the '545 patent," which is incorporated hereinto by reference). The '545 patent describes a system that places a vehicle TCU in a sleep mode, and activates a higher-power mode (e.g., a TCU extended power mode) to establish a data session with a telecommunication network. These non-limiting examples for low-power modes and higher power modes are submitted to provide examples only, and not intended to be limiting with respect to functionalities that may be enabled, disabled, and/or otherwise changed by altering the TCU power state.

For example, the pre-processor 151 may, in a lower-power mode, remain active (that is, receive continuous power) such that clock maintaining time information, date information, etc., when in a low-power mode, while keeping the secure processor 153 powered off or otherwise in a limited power mode. Accordingly, the pre-processor 151 may receive one or more BLE signals from the mobile device 120, and trigger a higher energy state based on the approaching mobile device 120. The BLE signal(s) may include the power mode instructions 260 that may be configured to change the TCU state from the low energy state to the higher energy state based at least in part on the predicted time interval.

Figure 2B:
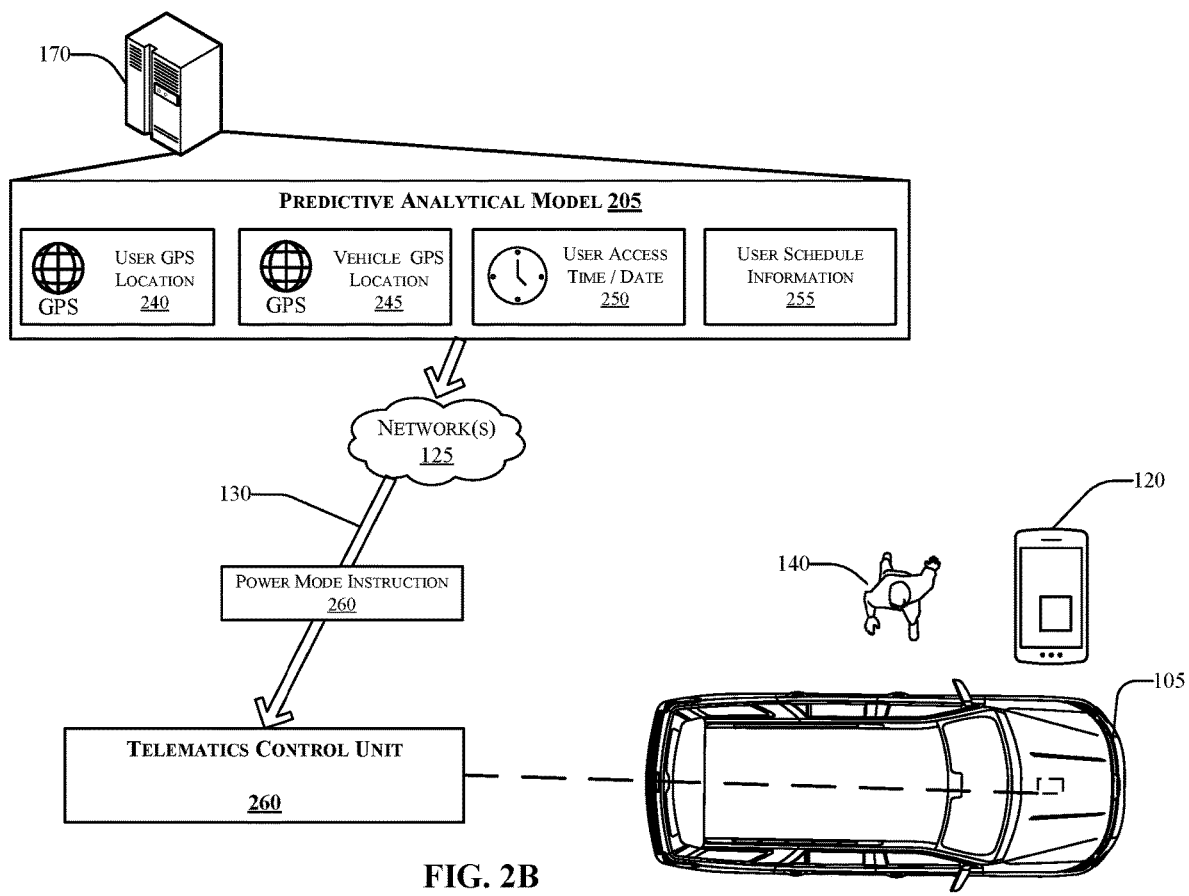
FIG. 2B illustrates another example embodiment of the present disclosure where a predictive model operates from a remote server to control power mode transitions according to embodiments described herein.

FIG. 2B depicts another example embodiment of the present disclosure where the predictive model 205 operates from the remote server(s) 270 to control power mode transitions. The user 140 is depicted approaching the vehicle 105 in FIG. 2B. As the user 140 approaches the vehicle 105, the vehicle GPS information may not be available to determine when to transition the TCU 160 from a low-power mode to a higher power mode, and thus, the vehicle GPS data may not be useful. Accordingly, the predicted time interval associated with a future key-on event for the vehicle 105 may provide this additional practical application.

In the present example, the remote server(s) 170 may actively run (execute an instantiation) of one or more application(s) (e.g., which may be substantially similar to the application(s) 135 depicted with respect to FIG. 1), and predict a time interval associated with the future key-on event for the vehicle 105. The prediction may be based on a day of the week, a date, a GPS location of the mobile device 120, a GPS location of the vehicle 105, and/or a calendar event associated with the user 104 that is stored in a digital calendar (not shown), or stored in another way (e.g., via a social media calendar, etc.). Accordingly, in an example embodiment of FIG. 2B, the server(s) 170 may be configured for predicting the time interval associated with the future key-on event for the vehicle 105, and transmitting the power mode instruction 260 to the vehicle TCU 160.

In some aspects, transmitting the power mode instruction 260 can include transmitting a wireless signal to the TCU 260 associated with the vehicle 105. The power mode instruction 260 may include one or more encoded instruction(s) configured to cause the vehicle TCU 160 to change a TCU state from a low energy state to a higher energy state the predicted time interval using the predictive analytical model 205 stored on the mobile device 120.

FIG. 3 depicts an embodiment where the automotive computer 145 is used to perform the predicting and analytical steps that determine a probable date and/or time where the user 140 is predicted to unlock and/or operate the vehicle 105. As shown in FIG. 3, the automotive computer 145 may receive the predictive analytical model 205 from the server(s) 170, and generate a power mode instruction 320 using the automotive computer 145. In one aspect, the pre-processor 151 may determine a present time, date, etc., and determine whether the present time and date corresponds to a predicted time interval that may be saved as part of the predictive analytical model 205, which may be stored in the memory 155 of the automotive computer 145. Responsive to determining that the present time, date, etc., is within the time interval indicated by predictive analytical model 205, the pre-processor 151 may signal the secure processor 153 to transition into a higher energy state to authenticate the mobile device 120 (and by extension, the user 140) as the user 140 approaches the vehicle 105. Accordingly, FIG. 3 depicts the user 140 approaching the vehicle 105, which may be during the predicted date and time interval as determined by the automotive computer 145.

The secure processor 153, once it is preemptively in a higher energy state, may validate the mobile device 120 for security and authentication as the user 140 approaches the vehicle 105. The vehicle TCU 160, and/or the automotive computer 145 may receive PaaK security credentials 310 from the application(s) 135 operating on the mobile device 120, and based at least in part on the PaaK security credentials, the user GPS location information 305, and/or other information, determine authenticity of the mobile device 120 for access to the vehicle 105 and secure operation of a key-on event. Verifying the security credentials may include comparing the user GPS location information 305 with stored user GPS location information 240, the vehicle GPS location information 245, and/or other data such as the user access time/date information 250 and/or the user schedule information 255.

In one aspect, when the vehicle TCU 160 receives the power mode instruction 320 in advance of the physical arrival of the user 140 (that is, in advance of the user contacting the vehicle to unlock the vehicle, for example), the pre-processor 142 may begin the process of powering up the secure processor 153, considering the PaaK security credentials 310 received from the mobile device 120 as the user 140 approaches the vehicle 105, and performing other authentication steps. Accordingly, based at least in part on the power mode instruction 260, the described system of FIG. 3 may have little or no delay caused by bringing the secure processor 153 to the higher energy state before the key-on event.

FIG. 4 illustrates a block diagram of an exemplary computer system 400 for use in practicing the embodiments described herein. The computing system 400 described herein can be implemented in hardware, software (e.g., firmware), or a combination thereof. The computing system 400 (also referred to herein as the system 400) may be substantially similar and/or identical to the server(s) 170 depicted in FIGS. 1-3.

As shown in FIG. 4, a computing system 400 may include the one or more processor(s) 405, memory 410 communicatively coupled to the one or more processor(s) 405, and an input/output adaptor 415 that can communicatively connect with external devices. The computing system 400 may operatively connect to and communicate information with one or more internal and/or external memory devices such as, for example, one or more databases 430 via a storage interface 420. The computing system 400 may include one or more network adaptor(s) 425 enabled to communicatively connect the computing system 400 with the one or more network(s) 125. In one embodiment, the computing system 400 can include one or more IP-based network(s) for communication between the computing system 400 and any external device. In such embodiments, the computing system 400 can further include one or more telecommunications adaptor(s) 440. The computing system 400 may further include and/or connect with one or more input devices 445 and/or one or more output devices 450 through the I/O adaptor 415.

The one or more processor(s) 405 are collectively a hardware device for executing program instructions (aka software) that may be stored in a computer-readable memory (e.g., the memory 410). The one or more processor(s) 405 can be a custom made or commercially-available processor, a central processing unit (CPU), a plurality of CPUs, an auxiliary processor among several other processors associated with the computing system 400, a semiconductor-based microprocessor (in the form of a microchip or chip set), or generally any device for executing instructions.

The one or more processor(s) 405 may be disposed in communication with one or more memory devices (e.g., the memory 410 and/or one or more external databases 430, etc.) via a storage interface 408. The storage interface 408 can also connect to one or more memory devices including, without limitation, the one or more database(s) 430, and/or one or more other memory drives (not shown) that may include, for example, a removable disc drive, a vehicle computing system memory, a cloud storage, etc., employing connection protocols such as serial advanced technology attachment (SATA), integrated drive electronics (IDE), universal serial bus (USB), fiber channel, small computer systems interface (SCSI), etc.

The memory 410 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The instructions in the memory 410 can include one or more separate programs, where any of which may include an ordered listing of computer-executable instructions for implementing logical functions. In the example of FIG. 4, the instructions in the memory 410 can include an operating system 455. The operating system 455 can control the execution of other computer programs such as, for example generating the predictive analytical model(s) described herein, receiving and storing the use data 200 (described with respect to FIG. 1) and performing other tasks such as and providing scheduling, input-output control, file and data management, memory management, and communication control and related services.

The program instructions stored in the memory 410 can further include application data 460, which may include data associated with the predictive analytics system 210, instructions for receiving the use data 200, and analyzing the use data 200. In one example, the use data 200 may include user profile information 470 and automobile fleet information 475, which may indicate other vehicle identified in the vehicle fleet (not shown in FIG. 4), computing elements associated with that vehicle, patterns of use, etc. The user profile information 470 and/or the automobile fleet information 475 may be stored in the database(s) 430 and may be accessible by the computing system 400 to determine and/or generate the predictive model 204 and/or other elements of the predictive analytics system 210. The program instructions in the memory 410 may further include instructions for controlling and/or interacting with the system 400 through a user interface 465.

The I/O adaptor 415 can connect a plurality of input devices 445 to the computing system 400. The input devices 445 can include, for example, a keyboard, a mouse, a microphone, a sensor, etc. The output devices 450 can include, for example, a display, a speaker, a touchscreen, etc. The I/O adaptor 415 can be configured to operatively connect one or more input/output (I/O) devices 407 to the computing system 400. For example, the I/O adaptor 415 can connect a keyboard and mouse, a touchscreen, a speaker, a haptic output device, or other output device. Finally, the I/O devices connectable to the I/O adaptor 415 can further include devices that communicate both inputs and outputs, for instance but are not limited to, a network interface card (NIC) or modulator/demodulator (for accessing other files, devices, systems, or a network), a radio frequency (RF) or other transceiver, a telephonic interface, a bridge, a router, and/or the like.

Figure 5:
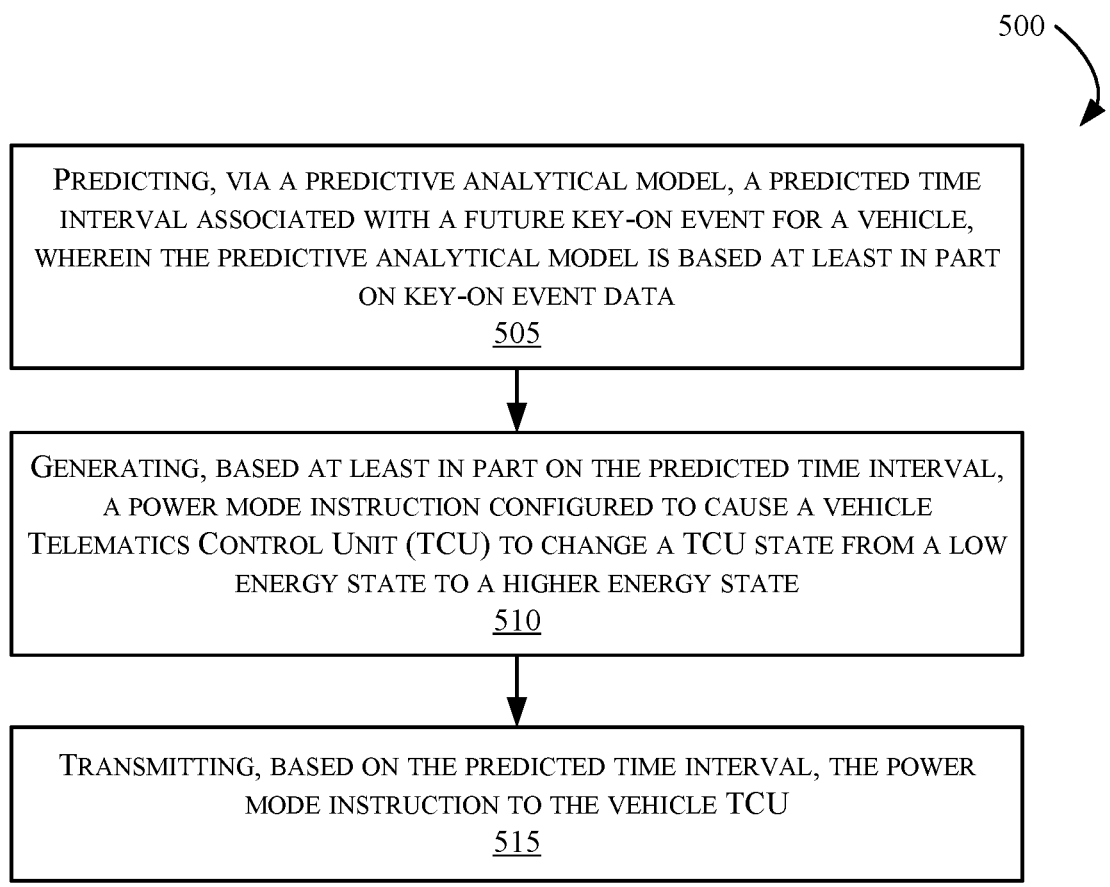
FIG. 5 is a flow diagram of an example method in accordance with the present disclosure.

FIG. 5 is a flowchart of an example method 500 of the present disclosure. The method 500 generally includes a step 505 that can include predicting, via the predictive analytical model 205, a predicted time interval associated with a future key-on event for a vehicle 105, where the predictive analytical model 205 is based at least in part on key-on event data. The key-on event data can include time information and date information associated with unlocking the vehicle 105, and can include Global Position Service (GPS) information indicative of a GPS location of one or more of the vehicle 105 and a mobile device (e.g., the mobile device 120) associated with the vehicle 105. In some aspects, the key-on event data can further include the key fob usage data 225, which may provide details indicative of how, when, and where the key fob 235 was historically used to unlock the vehicle 105. In other aspects, the key-on event data may include user-level data associated with a user of the vehicle 105 (e.g., the user 140).

In one embodiment, before predicting the predicted time interval, the method 500 may include a preliminary step of generating the predictive analytical model 205. Generating the predictive analytical model 205 may include receiving, from one or more of the vehicle TCU 160 and/or the mobile device 120 associated with the vehicle 105, key-on event data (e.g., the use data 200), which may be indicative of key-on events for the vehicle 105, and/or other vehicles in a vehicle fleet.

Next, after predicting the predicted time interval, the method can include a step 510 of generating, based at least in part on the predicted time interval, a power mode instruction (e.g., the power mode instruction 260 and/or 320) that may be configured to cause the vehicle TCU 160 to change a TCU state from a low energy state to a higher energy state.

The method can include another step 515, which may include transmitting, based on the predicted time interval, a power mode instruction (e.g., one of the power mode instructions 260 and/or 320), to the vehicle TCU 160. In some aspects, transmitting the power mode instruction 260, 320 comprises transmitting a wireless signal to a Bluetooth Low Energy (BLE) module associated with the vehicle, wherein the power mode instruction changes the TCU state from the low energy state to the higher energy state based at least in part on the predicted time interval.

Scheduled wake up messages from the server(s) 170 or connected mobile device(s) (e.g., the mobile device 120) can provide vehicle intelligence that preemptively determines when a low-power mode is unlikely to be acceptable to the user 140, and/or when higher-power modes are most likely helpful to reduce and/or eliminate lag time for vehicle 105 entry and operation. Moreover, embodiments of the present disclosure may centrally (from the one or more cloud-based server(s) 170), manage how the predictive analytics system 210 is built and transmitted to the vehicle 105, allowing centralized control that can maintain updatability and security features for the vehicle 105 after receiving the predictive analytical model 205.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, nonvolatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A computer-implemented method, comprising:
   determining, via a predictive analytical model, a predicted time interval associated with a future key-on event for a vehicle, wherein the predictive analytical model is based at least in part on historical key-on event data;
   determining, based at least in part on the predicted time interval, a power mode instruction configured to change a vehicle power state from a low energy state to a higher energy state, wherein the low energy state prevents communications between a vehicle Telematics Control Unit (TCU) and a mobile device, and wherein the higher energy state enables communications between the TCU and the mobile device; and
   transmitting, based on the predicted time interval, the power mode instruction to the vehicle.

2. The computer-implemented method of claim 1, wherein changing the vehicle power state comprises causing the vehicle TCU to change the vehicle power state from the low energy state to the higher energy state.

3. The computer-implemented method of claim 1, wherein changing the vehicle power state comprises causing a Phone as a Key (PaaK) system to change the vehicle power state from the low energy state to the higher energy state.

4. The computer-implemented method of claim 1, wherein changing the vehicle power state comprises causing a Phone as a Key (PaaK) system to change the PaaK system from the low energy state to the higher energy state.

5. The computer-implemented method of claim 1, wherein changing the vehicle power state comprises causing a Phone as a Key (PaaK) system to change a vehicle Telematics Control Unit (TCU) from the low energy state to the higher energy state.

6. The computer-implemented method of claim 1, wherein changing the vehicle power state comprises causing the vehicle Telematics Control Unit (TCU) to change the vehicle TCU from the low energy state to the higher energy state.

7. The computer-implemented method according to claim 1, wherein the key-on event data comprises time information and date information associated with one or more of unlocking the vehicle, actuating a door latch mechanism, opening a door, starting a motor, performing a remote start/climate control, or a vehicle function that indicates user intent to access or operate the vehicle.

8. The computer-implemented method according to claim 1, wherein the key-on event data comprises Global Position Service (GPS) information indicative of a GPS location of one or more of the vehicle and a mobile device associated with the vehicle.

9. The computer-implemented method according to claim 1, wherein the key-on event data comprises key fob information associated with a key fob used to perform one or more of unlocking the vehicle, starting a motor, performing a remote start/climate control, or a vehicle function that indicates user intent to access or operate the vehicle.

10. The computer-implemented method according to claim 1, wherein the key-on event data comprises user-level data associated with a user of the vehicle.

11. The computer-implemented method according to claim 1, further comprising:
    receiving, from one or more of the vehicle Telematics Control Unit (TCU) and a mobile device associated with the vehicle, the key-on event data indicative of a plurality of key-on events; and
    generating, based on the key-on event data indicative of the plurality of key-on events, the predictive analytical model.

12. The computer-implemented method according to claim 11, wherein the key-on event data comprises fleet-level data associated with vehicles in a plurality of vehicle fleets; and
    grouping vehicles automatically into the plurality of vehicle fleets, based on a vehicle make, model, primary approximate geo-locations, trim level, or feature level.

13. The computer-implemented method of claim 1, wherein transmitting the power mode instruction comprises transmitting a wireless signal to a Bluetooth Low Energy (BLE) module associated with the vehicle, wherein the power mode instruction changes the vehicle power state from the low energy state to the higher energy state based at least in part on the predicted time interval.

14. The computer-implemented method of claim 1, further comprising transmitting the predictive analytical model to a mobile device.

15. The computer-implemented method of claim 14, wherein the mobile device is configured for determining the predicted time interval associated with the future key-on event for the vehicle, and transmitting the power mode instruction to the vehicle.

16. The computer-implemented method of claim 1, further comprising transmitting the predictive analytical model to an automotive computer onboard the vehicle.

17. The computer-implemented method of claim 16, wherein the automotive computer onboard the vehicle is configured for determining the predicted time interval associated with the future key-on event for the vehicle, and transmitting the power mode instruction to the vehicle.

18. A system, comprising:
a processor; and
a memory for storing executable instructions, the processor configured to execute instructions to:
determine, via a predictive analytical model, a predicted time interval associated with a future key-on event for a vehicle, wherein the predictive analytical model is based at least in part on historical key-on event data;
determine, based at least in part on the predicted time interval, a power mode instruction configured to cause a vehicle Telematics Control Unit (TCU) to change from a low energy state to a higher energy state, wherein the low energy state prevents communications between the vehicle TCU and a mobile device, and wherein the higher energy state enables communications between the vehicle TCU and the mobile device; and transmit, based on the predicted time interval, the power mode instruction to the vehicle TCU.

19. The system according to claim 18, wherein the key-on event data comprises time information and date information associated with unlocking the vehicle, actuating a door latch mechanism, opening a door, starting a motor, performing a remote start/climate control, or similar vehicle functions that indicate user intent to access or operate the vehicle.

20. A vehicle, comprising:
a processor; and
a memory for storing executable instructions, the processor configured to execute instructions to:
receiving, from one or more of a vehicle Telematics Control Unit (TCU) and a mobile device associated with the vehicle, key-on event data indicative of a plurality of key-on events;
generating, based on the key-on event data indicative of the plurality of key-on events, a predictive analytical model;
determine, via the predictive analytical model, a predicted time interval associated with a future key-on event for a vehicle, wherein the predictive analytical model is based at least in part on key-on event data;
determine, based at least in part on the predicted time interval, a power mode instruction configured to cause a vehicle Phone-as-a-Key (PaaK) system to change from a low energy state to a higher energy state; and
adjust, based on the power mode instruction, a power mode of the vehicle from the low energy state to the higher energy state.

* * * * *